(12) United States Patent
Wu et al.

(10) Patent No.: US 6,964,626 B1
(45) Date of Patent: Nov. 15, 2005

(54) HIGH TEMPERATURE POLYURETHANE/UREA ELASTOMERS

(75) Inventors: William W. L. Wu, Elizabethtown, KY (US); James R. Stamp, Elizabethtown, KY (US); W. Joe Brothers, Elizabethtown, KY (US)

(73) Assignee: The Gates Corporation, Denver, CO (US)

(*) Notice: Subject to any disclaimer, the term of this patent is extended or adjusted under 35 U.S.C. 154(b) by 1705 days.

(21) Appl. No.: 08/664,080

(22) Filed: Jun. 12, 1996

Related U.S. Application Data

(63) Continuation of application No. 08/275,215, filed on Jul. 14, 1994, now abandoned.

(51) Int. Cl.$^7$ .......................... F16G 1/14; F16G 5/12; C08G 18/75; C08G 18/76; C08G 18/42
(52) U.S. Cl. ................. 474/260; 474/263; 474/264; 474/265; 474/266; 528/60; 528/61; 528/63; 528/64; 528/65; 528/66; 528/67; 528/74; 528/80; 528/81; 528/83; 528/85; 528/906
(58) Field of Search ................. 474/260, 263, 474/264, 265, 266; 528/60, 61, 63, 64, 65, 528/66, 67, 74, 80, 81, 83, 85, 906

(56) References Cited

U.S. PATENT DOCUMENTS

| | | | | |
|---|---|---|---|---|
| 3,620,905 A | * | 11/1971 | Ahramjian | 161/190 |
| 3,789,032 A | * | 1/1974 | Hoeschele | 528/63 |
| 3,857,819 A | * | 12/1974 | Mathis | 528/57 |
| 3,997,514 A | * | 12/1976 | Kogon | 528/64 |
| 4,256,869 A | * | 3/1981 | Schulze et al. | 528/67 |
| 4,337,130 A | * | 6/1982 | Ahramjian | 524/539 |
| 4,423,200 A | * | 12/1983 | Ganster et al. | 528/67 |
| 4,442,281 A | * | 4/1984 | Hentschel et al. | 528/79 |
| 4,487,913 A | * | 12/1984 | Chung | 528/83 |
| 4,507,459 A | * | 3/1985 | Schmidt et al. | 528/64 |
| 4,519,432 A | * | 5/1985 | Schmidt et al. | 528/64 |
| 4,892,920 A | * | 1/1990 | Quay et al. | 528/83 |
| 4,952,632 A | * | 8/1990 | Gras et al. | 528/45 |
| 4,970,306 A | * | 11/1990 | Gras et al. | 540/525 |
| 4,990,586 A | * | 2/1991 | Case | 528/60 |
| 5,021,534 A | | 6/1991 | Kawasaki et al. | 528/60 |
| 5,066,762 A | | 11/1991 | Ohbuchi et al. | 528/85 |
| 5,086,150 A | * | 2/1992 | Frauendorf et al. | 528/45 |
| 5,106,874 A | | 4/1992 | Porter et al. | 528/64 |
| 5,112,282 A | | 5/1992 | Patterson | 474/260 |
| 5,141,967 A | | 8/1992 | Mafoti et al. | 521/159 |
| 5,185,420 A | | 2/1993 | Smith et al. | 528/61 |
| 5,208,315 A | * | 5/1993 | Seneker | 528/76 |
| 5,231,159 A | | 7/1993 | Patterson et al. | 528/53 |
| 5,262,448 A | | 11/1993 | Ruckes et al. | 521/159 |
| 5,410,009 A | * | 4/1995 | Kato et al. | 528/64 |

FOREIGN PATENT DOCUMENTS

| | | |
|---|---|---|
| EP | 0410240 | 1/1991 |
| EP | 0579989 | 1/1994 |

OTHER PUBLICATIONS

Syed et al.; "Stability in the Water: Aliphatic Diisocyanates in PUs"; Urethanes Technology; Jul., 1988; pp. 25-27.*
"A TPE based on p-phenylene dissocyanate", David Russel, Ralph Moore, Wayne C. Welchel, Rubber and Plastic News, Sep. 30, 1991, pp 15-18.
"High Performance Thermoplastic Polyurethane Elastomer", Y. Maeda, Y. Ohbuchi, S. Sato, 32d *Annual Polyurethane Technical/Marketing Conference*, Oct. 1-4, 1989, pp 112-117.
"Castable Polyurea Elastomers for Toothed Belts", Y. Taguchi, M. Furukawa, T. Yokoyama, Plastics, Rubber and Composites Processing and Applications, vol. 21, No. 4, Apr. 1994, pp 219-224.

* cited by examiner

*Primary Examiner*—Rabon Sergent
(74) *Attorney, Agent, or Firm*—C. H. Castleman, Esq.; S. G. Austin, Esq.; J. A. Thurnau, Esq.

(57) ABSTRACT

The present invention relates to molded polyurethane/urea elastomers, and specifically to improved polyurethane/urea elastomers having high temperature stability to about 140–150° C. and low temperature flexibility at about –35–(–40)° C., for use in dynamic applications. These elastomers are particularly useful for application in belts, specifically in automotive timing or synchronous belts, V-belts, multi V-ribbed or micro-ribbed belts, flat belting and the like. The polyurethane/urea elastomers of the present invention are prepared by reacting polyisocyanate prepolymers with symmetric primary diamine chain extenders, mixtures of symmetric primary diamine chain extenders and secondary diamine chain extenders, or mixtures of symmetric primary diamine chain extenders and non-oxidative polyols, which are all chosen to eliminate the need for catalysts via standard molding processes, and to improve phase separation. The polyisocyanate prepolymers are reaction products of polyols which are nonoxidative at high temperatures, such as polycarbonate polyols, polyester polyols, or mixtures thereof, with organic polyisocyanates which are either compact, symmetric and aromatic, such as para-phenylene diisocyanate, 1,5-naphthalene diisocyanate, and 2,6-toluene diisocyanate, or are aliphatic and possess trans or trans,trans geometric structure, such as trans-1,4-cyclohexane diisocyanate and trans,trans-4,4'-dicyclohexylmethyl diisocyanate.

33 Claims, 1 Drawing Sheet

HIGH TEMPERATURE POLYURETHANE/UREA ELASTOMERS

This application is a continuation, of application Ser. No. 08/275,215 filed Jul. 14, 1994, now abandoned.

BACKGROUND OF THE INVENTION

1. Field of the Invention

The present invention relates to molded polyurethane/urea elastomers. Specifically, the invention relates to improved molded polyurethane/urea elastomers with high and low temperature resistance in dynamic applications, and especially to improved belts utilizing these improved elastomers. These polymeric elastomers exhibit improved thermal stability while maintaining acceptable static and dynamic properties, including chemical resistance, cold flexibility, flex crack resistance and low hysteresis.

2. Description of the Prior Art

Belts, such as timing or synchronous belts, V-belts, multi V-ribbed belts, micro-ribbed belts, flat belting and the like, constructed from polyurethane or polyurethane/urea elastomers offer a number of significant advantages over conventional rubber belting. Among these advantages are that polyurethane and polyurethane/urea belts have greater flex resistance, oil resistance, hydrolysis resistance, and demonstrate improved load carrying capability. These belts can be vacuum spin cast in a single operation, injection molded, or batch cast. Conventional rubber tooth-type belts require numerous fabrication steps.

Polyurethane/urea based elastomers are traditionally prepared by reacting a relatively high molecular weight active hydroxyl-terminated material, such as a polyol, and a relatively low molecular weight active amine-terminated material, known as a chain extender, with a polyisocyanate via either one-shot or two-step (prepolymer) approach. In preparing the elastomer, the reactive components and any catalysts or optional additives are blended together and then transferred to a mold of suitable shape where the formulation is cured. Typically, this blending is accomplished in a batch process. The mixture is cured in the mold until it is capable of maintaining the molded shape, demolded and postcured until polymerization is complete. Alternatively, the elastomer may be prepared via Reaction Injection Molding (RIM), in which the active hydrogen containing materials are mixed rapidly with polyisocyanate via impingement and simultaneously injected into a mold where the reaction takes place.

Relatively high and low temperature resistant molded belts utilizing polyurethane/urea elastomers which are reaction products of 4,4'-diphenyl methane diisocyanate (MDI), poly(propylene oxide) polyol, and a diamine chain extender are known. These elastomer formulations typically include an antioxidant to improve thermal stability. The antioxidant is necessary to retard the oxidation of polyether polyols, which normally takes place at 100–130° C. Notably, the antioxidant retards but does not eliminate polyether oxidation at high temperatures, thus the thermal stability initially observed diminishes with increased time and usage of the belt. Additionally, the formulations typically allow for the use of catalysts which are known to accelerate reversion of the resulting elastomers at high temperatures.

An improvement in the thermal stability of polyurethane and polyurethane/urea elastomers is achieved by utilizing para-phenylene diisocyanate (PPDI) in the polyisocyanate prepolymer composition. The high isocyanate reactivity differential of PPDI relative to MDI results in a decrease in oligomer formation and a proportionate decrease in free diisocyanate in the prepolymer. Consequently, PPDI prepolymer promotes greater phase separation of the hard and soft segments, and hence better thermal stability of the resulting elastomer.

Thermoplastic polyurethane resin prepared from PPDI, a poly(hexamethylene carbonate) polyol, and a short chain polyol such as 1,4-butanediol or 1,4-bis-(beta-hydroxyethoxy) benzene is known. A disadvantage of this material is the use of hydroxyl-terminated chain extenders in forming the resulting polyurethane elastomer. While exhibiting favorable processing characteristics, it has been found that hydroxyl-terminated chain extenders form relatively weak urethane linkages with the polyisocyanate prepolymer, which detract from polyurethane elastomer's performance in dynamic applications.

Various factors contribute to traditional polyurethane or polyrethane/urea elastomer's thermal instability. These include polyether oxidation if polyether polyol is used as the soft segment, rapid reversion if catalysts are present in the formulations, poor phase separation if polyisocyanates or chain extenders with unfavorable structures are used, and relatively weak urethane linkages if hydroxyl chain extenders are used. In certain belt applications such as automotive timing or synchronous belts, V-belts, multi V-ribbed belts, micro-ribbed belts, and the like, such belts are subjected to repeated high and low temperature extremes in dynamic loading conditions. Polyurethane and polyurethane/urea elastomers have to date been unacceptable for these long term dynamic applications due to their tendency to shear and/or crack under these conditions. The difficulties become more apparent as the demand for automotive engines with higher application temperatures increases. Thus, there remains a need for polyurethane/urea elastomer incorporated in belts that have excellent load carrying capability as well as the characteristics necessary to withstand repeated dynamic loading under high and low temperature conditions for long periods of time, whether such belts are in the form of timing or synchronous belts, V-belts, multi V-ribbed belts, micro-ribbed belts, or the like.

SUMMARY OF THE INVENTION

Accordingly, it is one object of the present invention to provide an improved polyurethane/urea elastomer composition having high and low temperature resistance properties in dynamic applications.

Another object of the present invention is to provide an improved polyurethane/urea belt having high and low temperature resistance properties when subjected to continuous power transmission applications.

To achieve the foregoing and other objects and in accordance with a purpose of the present invention, as embodied and broadly described herein, a high and low temperature resistant belt incorporating an improved molded elastomer is disclosed. The belt includes a main belt body portion prepared from a polyurethane/urea elastomer. A tensile member is disposed within the body portion, and a sheave contact portion is integral with the main body portion. The elastomer has high and low temperature resistant properties in dynamic applications and includes the reaction product of a polyisocyanate prepolymer prepared from either a compact and symmetric aromatic diisocyanate or a trans or trans,trans geometrically configured aliphatic diisocyanate, and a polyol non-oxidative up to 150° C., with one or more aromatic symmetric primary diamine chain extenders, optionally mixed with aromatic secondary diamine chain extenders, or with non-oxidative polyols. The chain extender is capable of rapidly reacting with the polyisocyanate prepolymer in the absence of catalysts, when admixed therewith according to established molding methods.

BRIEF DESCRIPTION OF THE DRAWINGS

The accompanying drawings which are incorporated in and form a part of the specification illustrate preferred embodiments of the invention, and together with a description, serve to explain the principles of the invention. In the drawings.

DESCRIPTION OF THE PREFERRED EMBODIMENTS

Figure 1:
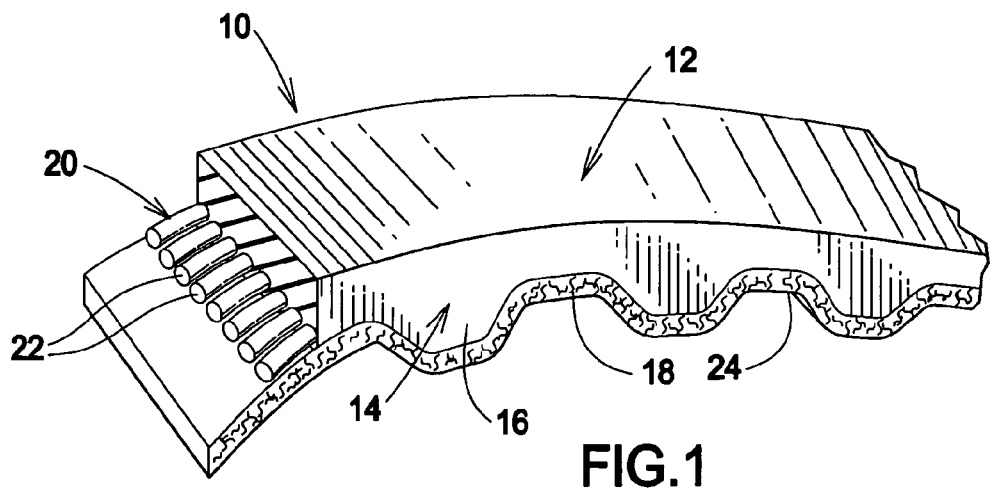
FIG. 1 is a perspective view, with parts in section, of a timing belt constructed in accordance with the present invention.

Referring to FIG. 1, a typical timing belt 10 is illustrated. The belt 10 includes an elastomeric main body portion 12 and a sheave contact portion 14 positioned along the inner periphery of the main body portion 12. This particular sheave contact portion 14 is in the form of alternating teeth 16 and land portions 18. A tensile layer 20 is positioned within the main body portion 12 for providing support and strength to the belt 10. In the illustrated form, the tensile layer 20 is in the form of a plurality of cords 22 aligned longitudinally along the length of the main body portion 12. It should be understood, however, that any type of tensile layer 20 known to the art may be utilized. Moreover, any desired material may be used as the tensile member, such as cotton, rayon, nylon, polyester, aramid, steel and even discontinuous fibers oriented for low load carrying capability. In the preferred embodiment of FIG. 1, the tensile layer 20 is in the form of the illustrated cords 22 made from aramid fiber. Other preferred cords include fiberglass and carbon filament for timing belts as in FIG. 1, and polyester cords for V-belts as in FIG. 2, below.

A reinforcing fabric 24 may be utilized and intimately fits along the alternating teeth 16 and alternating land portions 18 of the belt 10 to form a face cover therefor. This fabric may be of any desired configuration such as a conventional weave consisting of warp and weft threads at any desired angle or may consist of warp threads held together by space pick cords, or of a knitted or braided configuration, and the like. More than one ply of fabric may be employed. If desired, the fabric 24 may be cut on a bias so that the strands form an angle with the direction of travel of the belt. Conventional fabrics may be employed using such materials as cotton, polyester, polyamide, hemp, jute, fiberglass and various other natural and synthetic fibers. In a preferred embodiment of the invention, the fabric layer 24 consists of an expansible wear-resistant fabric in which at least one of the warp or weft threads is made of nylon. In the preferred form, the fabric layer 24 is made from a nylon 66 stretch fabric, and presents an elastomer- (polyurethane/urea-) free surface for engaging cooperating drive sheaves.

Figure 2:
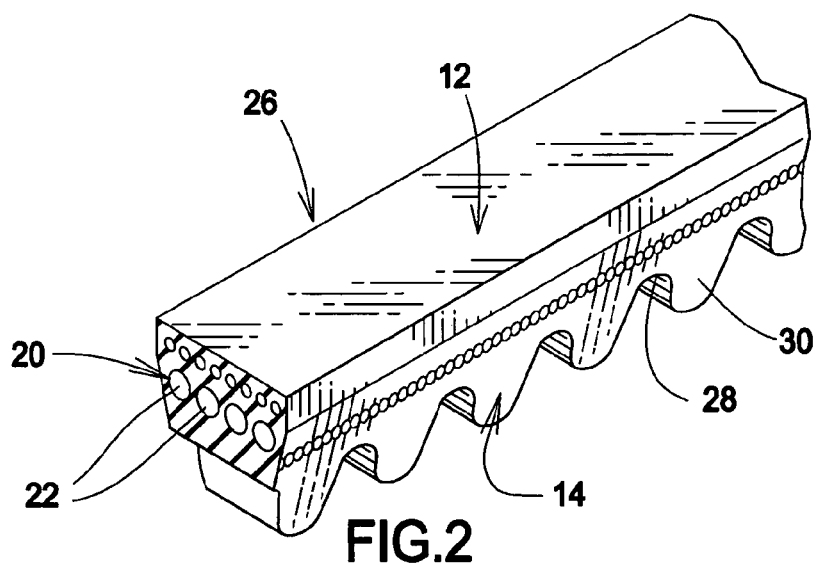
FIG. 2 is a perspective view, with parts in section, of a V-belt constructed in accordance with the present invention.

Referring to FIG. 2, a standard notched V-belt 26 is illustrated therein. The V-belt 26 includes an elastomeric body portion 12 similar to that of FIG. 1 and a tensile reinforcement member 20 in the form of cords 22, also similar to that as illustrated in FIG. 1. The elastomeric body 12 and the cords 22 of the V-belt 26 are constructed from the same materials as described above for FIG. 1.

The V-belt 26 also includes a sheave contact portion 14 as in the power transmission belt of FIG. 1. In this embodiment, however, the juxtaposed sheave contact portions 14 are in the form of alternating notch depression surfaces or troughs 28 and toothed projections 30. These alternating notched depression surfaces 28 and tooth projections 30 preferably follow a generally sinusoidal path as illustrated which serves to distribute and minimize bending stresses as the sheave contact portion 14 passes around pulleys and sheaves.

Figure 3:
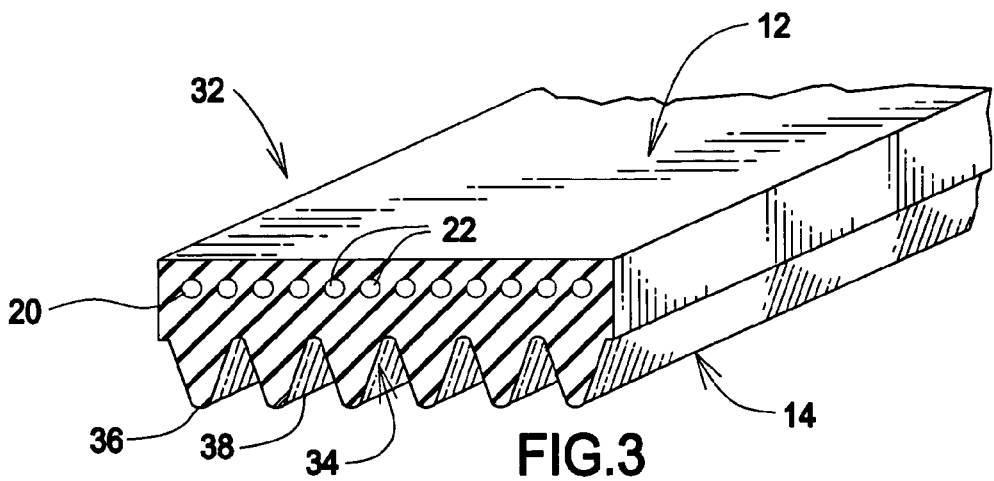
FIG. 3 is a perspective view, with parts in section, of a multi V-ribbed belt constructed in accordance with the present invention.

Referring to FIG. 3, a multi V-ribbed belt 32 is illustrated. The multi V- ribbed belt 32 includes a main elastomeric body portion 12 as in the belts of FIGS. 1 and 2 and also includes a tensile reinforcement member 20 preferably in the form of cords 22, also as previously described. The grooved sheave contact portion 14 is in the form of a plurality of raised areas or apexes 36 alternating with a plurality of trough areas 38 having oppositely facing sides which define driving surfaces of the belt 32. In each of these instances of FIGS. 1–3, the sheave contact portion 14 is integral with the main body portion 12 and formed from the same elastomeric material to be described in greater detail below. While the present invention is illustrated with reference to the embodiments shown in FIGS. 1–3, it should be understood that the present invention is not to be limited to these particular embodiments or forms as illustrated but rather is applicable to any belt construction within the scope of the claims as defined below.

The polyurethane/urea elastomers of the present invention are reaction products of polyisocyanate prepolymers with diamine chain extenders, via standard molding processes. The polyisocyanate prepolymers are reaction products of polyols nonoxidative up to 150° C., such as polycarbonate polyol, polyester polyol, or mixtures thereof, with either symmetric, compact, aromatic diisocyanates, such as PPDI, or trans- or trans,trans-geometrically configured aliphatic diisocyanates, such as trans-1,4-cyclohexane diisocyanate (t-CHDI). The polyurethane/urea elastomers of this invention have thermal stability up to about 140–150° C. and low temperature flexibility to about −35–(−40)° C. The thermally stable belts of the present invention, including automotive timing or synchronous belts, V-belts, multi V-ribbed belts, micro-ribbed belts, flat belting and the like, utilize the polyurethane/urea elastomers of this invention as their main body portion, and are manufactured using established belt fabrication methods.

The present invention utilizes a two-step (prepolymer) approach via standard molding processes for preparing the polyurethane/urea elastomers. In the first step, the polyol or polyol mixture and the polyisocyanate react to yield the polyisocyanate prepolymer. In the second step, the polyisocyanate prepolymer and the chain extender react to produce the final polyurethane/urea elastomers.

All of the various reactants are known to the art. The organic polyisocyanates suitable for the polyisocyanate prepolymers used in the present invention are those possessing the following characteristics: compact and symmetric structure for aromatic compounds, or trans or trans,trans geometric structure for aliphatic compounds, for improved phase separation of the resulting elastomers, and high reactivity with amine groups to eliminate the need for catalysts in the formulations, which otherwise accelerate reversion of the resulting elastomers at high temperatures. The polyisocyanates useful as starting components for the preparation of the polyisocyanate prepolymers include but are not limited to compact, symmetric aromatic diisocyanates, including but not limited to PPDI, 1,5-naphthalene diisocyanate (NDI), and 2,6- toluene diisocyanate (2,6-TDI). The polyisocyanates useful as starting components for the preparation of the polyisocyanate prepolymers also include cycloaliphatic diisocyanates with trans or trans,trans geometric configuration. These isomers are generally pure, i.e., they exist in the substantial absence of cis-configured isomers, and thus promote good phase separation once cured. These include but are not limited to t-CHDI, and trans,trans-4,4'-dicyclohexylmethyl diisocyanate (t,t-HMDI).

The polyols useful in the polyisocyanate prepolymers used in the present invention are also generally known to the art. Suitable polyols are nonoxidative up to 150° C., and include but are not limited to polyester polyols and polycarbonate polyols. Polyether polyols are not suitable for the present invention since they are extremely susceptible to oxidation at 150° C. Polythioether polyols are not suitable for the present invention since they give rise to elastomers susceptible to macroradical coupling, and are therefore brittle at 150° C. This is due to the presence of methylene protons adjacent to sulfur atoms, which undergo massive hydrogen abstractions at 150° C. and induce coupling between two polythioether soft segments.

The polyester polyols used in the present invention include but are not limited to reaction products of polyhydric, preferably dihydric alcohols, optionally with the addition of trihydric alcohols, and polybasic, preferably dibasic carboxylic acids. The corresponding polycarboxylic acid anhydrides or corresponding polycarboxylic acid esters of lower alcohols or mixtures thereof are preferred over their free polycarboxylic acid counterparts for preparing the polyesters. The polycarboxylic acids may be aliphatic, cycloaliphatic, and/or aromatic in nature. The following are mentioned as non-limiting examples: succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, endomethylene tetrahydrophthalic acid anhydride, glutaric acid anhydride, fumaric acid, dimeric and trimeric fatty acids, optionally mixed with monomeric fatty acids, dimethylterephthalate and terephthalic acid-bis-glycol esters. Suitable polyhydric alcohols used to produce such polyesters include but are not limited to the following; ethylene glycol, 1,2- and 1,3-propylene glycol, 1,4- and 2,3-butylene glycol, 1,6-hexanediol, 1,8-octanediol, 1,10-decanediol, neopentyl glycol, 1,4-cyclohexane dimethanol or 1,4-bis-hydroxymethylcyclohexane, 2-methyl-1,3-propanediol, glycerol, trimethylopropane, 1,2,6-hexanetriol, 1,2,4-butanetriol, trimethylolethane, and mixtures thereof. Polyesters of lactones, such as ε-caprolactone, and hydroxycarboxylic acids, such as ω-hydroxycaproic acid, may also be used.

Suitable polycarbonate polyols are known and may be prepared, for example, by the reaction of diols, such as 1,3-propanediol, 1,4-butanediol, 1,6-hexanediol, 1,10-decanediol, neopentyl glycol, diethylene glycol, triethylene glycol or tetraethylene glycol, and mixtures thereof, with diaryl carbonates, e.g. diphenyl carbonate, dialkyl carbonate, e.g. diethyl carbonate, or phosgene.

The preferred polyols are polycarbonate polyols and polyester polyols with molecular weights from about 500 to about 3000, or mixtures of these polyols. The more preferred polyols are poly(hexamethylene carbonate) diol, polycaprolactone diol, and poly(hexamethylene adipate) diol with molecular weights from about 500 to about 3000. The most preferred polyols are poly(hexamethylene carbonate) diol, polycaprolactone diol and poly(hexamethylene adipate) diol with molecular weights from about 1500 to about 2500. The polyols are dried to a moisture level of less than about 0.03% by weight, and more preferably, to a level of about 0.0150% by weight prior to reaction with the diisocyanates to form the polyisocyanate prepolymers useful for this invention.

The use of diamine chain extenders, while typically more difficult to process than diol chain extenders due to their higher melting points, contribute greater thermal stability via urea linkages which are more stable than their urethane counterparts. The preferred diamine chain extenders useful in the present invention possess the following three characteristics: symmetric structure for improved phase separation of the resulting elastomers; non-bulky substitute groups on the aromatic rings if such groups are present in order that hard segment crystallization and overall phase separation of the resulting elastomers is not retarded; and proper reactivity with isocyanate group thus eliminating the need for catalysts in the formulations. Primary diamine chain extenders are used for proper reactivity.

The symmetric primary diamine chain extenders useful in the present invention are those capable of reacting with polyisocyanate prepolymers rapidly without the need for catalysts. In addition, these chain extenders must uniquely contribute to the excellent dynamic performance of the resulting elastomers of the present invention. The symmetry of the chain extenders useful in the present invention provides improved phase separation and hence increases the thermal stability of the final polyurethane/urea elastomers in dynamic applications. Suitable primary diamine chain extenders include but are not limited to symmetric aromatic amines with molecular weights of from about 90 to about 500, and mixtures thereof. Examples include: 1,4-phenylenediamine, 2,6-diaminotoluene, 1,5-naphthalenediamine, 4,4'-diaminodiphenyl methane, 3,3'-dimethyl-4,4'-diaminodiphenyl methane, 1-methyl-3,5-bis(methylthio)-2,6-diaminobenzene, 1-methyl-3,5-diethyl-2,6-diaminobenzene, 4,4'-methylene-bis-(3-chloro-2,6-diethylaniline), 4,4'-methylene-bis-(ortho-chloroaniline), 4,4'-methylene-bis-(2,3-dichloroaniline), trimethylene glycol di-para-aminobenzoate, 4,4'-methylene-bis-(2,6-diethylaniline), 4,4'-methylene-bis-(2,6-diisopropylaniline), 4,4'-methylene-bis-(2-methyl-6-isopropylaniline), 4,4'-diamino diphenyl sulfone, and the like.

The symmetric aromatic primary diamine chain extenders may optionally be combined with up to about 25% secondary diamine chain extenders in order to vary elastomer characteristics such as hardness. Suitable examples of aromatic secondary diamine chain extenders have molecular weights of from about 150 to about 500, and include but are not limited to N,N'-di-sec-butyl-amino benzene and N,N'-di-sec-butyl-amino-diphenylmethane.

The symmetric aromatic primary diamine chain extenders may also be combined with one or more of the polyols described above and contained in the prepolymer, in order to alter process and product characteristics such as mixing ratio, processing temperature, flexibility, etc. These long chain polyols do not act as chain extenders, but reduce the amount of hard segment in the elastomer, thus reducing it's hardness. This may be desirable for some applications. Suitable weight ratios of polyol to symmetric primary diamine chain extender may be from about 30:70 to about 60:40, and is more preferably from about 40:60 to about 50:50.

Neither aliphatic nor aromatic short chain hydroxyl compounds are suitable as chain extenders for the present invention due to the instability of urethane linkages in the resulting elastomers at high temperatures, and their inadequate dynamic properties in applications at high temperatures.

The preparation of polyisocyanate prepolymers through reaction of a polyisocyanate and a polyol or polyol mixture is well known to the art. The general criteria for choosing the order of addition is that which will minimize the amount of oligomers, which otherwise induce processing difficulties in the form of high prepolymer viscosity. Other factors must also be considered in choosing the order of addition for preparing polyisocyanate prepolymers. It is known, for example, that if the polyol component is added into liquid PPDI at a temperature above its melting point of 95° C., a high degree of dimerization and sublimation of PPDI takes place. In the Examples that follow, all of the polyols were added to the polyisocyanates, except for in the PPDI-based prepolymer synthesis, in which PPDI was added to the polyol. If required, a small amount of stabilizer, such as benzoyl chloride, may be added into the polyisocyanate prepolymer during its preparation stage. A preferred mixing ratio of polyisocyanate to polyol expressed as a stoichiometric ratio of NCO/OH is from about 1.8:1 to about 2.4:1, and, for prepolymers based on PPDI, is more preferably about 2:1, and for prepolymers based on t,t-HMDI, is more preferably about 2.2:1. The reaction of the diisocyanate and polyol is carried out preferably from about 3 hours to about 10 hours, more preferably from about 5 to about 6 hours. The polyisocyanate prepolymers useful in the present invention include an isocyanate group content of approximately 2 to 12 weight percent NCO, more preferably 3 to 7 weight percent NCO, and most preferably 3.4 to 4.0 weight percent NCO.

The polyisocyanate prepolymers of the present invention may be reacted via standard molding processes with a chain extender as known in the polyurethane/urea art. The polyurethane/urea elastomers of the present invention utilize an isocyanate to amine or amine/hydroxyl equivalent ratio of from about 0.95:1 to about 1.2:1, and more preferably, from about 1.05:1 to about 1.1:1.

The polyurethane/urea elastomers of the present invention may be mixed with additives such as pigments, colorants, antistatic agents, etc., at a suitable stage of belt fabrication.

The present invention is further illustrated but is not intended to be limited by the following examples in which all parts and percentages are by weight unless otherwise specified.

PPDI-based Prepolymer Synthesis 1400 parts of each polyol or polyol mixture, as described in the appropriate Examples of Tables 1–4, were held at 90° C. in a reactor equipped with mechanical stirrer and vacuum source, and dried to a moisture level less than about 0.03%, and preferably, to about 0.015%. The temperature was then lowered to and held at 70° C. During this holding step, 448 parts of PPDI were added all at once into the same reactor with rapid stirring. The mixture in the reactor was allowed to react at 70° C. for 5 hours, after which NCO titration was carried out to verify the completion of the reaction.

t,t-HMDI-based Prepolymer Synthesis 1400 parts of the polyol mixture described in Example 9 of Table 2 were held at 90° C. in a reactor equipped with mechanical stirrer and vacuum source, and dried to a moisture level of about 0.015%. In another reactor, equipped with mechanical stirrer and nitrogen blanket, 395.7 parts of t,t-HMDI, available from Miles Inc., were added as a melt at 90° C. The dried polyol mixture was added into the reactor stepwise with stirring, in order to minimize the reaction exotherm. The contents of the reactor were allowed to react at 90° C. for 8 hours, after which NCO titration was carried out to verify the completion of the reaction.

80:20 TDI-based Prepolymer Synthesis 1089 parts of the polyol mixture described in Example 19 of Table 4, were held at 90° C. in a reactor equipped with mechanical stirrer and vacuum source, and dried to a moisture level of about 0.015%. The dried polyol mixture was then maintained at 60° C. In another reactor equipped with mechanical stirrer and nitrogen blanket, 335.5 parts of 2,4- and 2,6-TDI mixture at a weight ratio of 80:20, available from Miles Inc. under the trade name Mondur T-80, were added at ambient temperature. The polyol mixture at 60° C. was added into the reactor stepwise, with stirring, in order to minimize the reaction exotherm. The contents of the reactor were allowed to react at 80° C. for 10 hours, after which NCO titration was carried out to verify the completion of the reaction.

MDI-based Prepolymer Synthesis 1111 parts of the polyol mixture described in Example 20 of Table 4 were held at 90° C. in a reactor equipped with mechanical stirrer and vacuum source, and dried to a moisture level of about 0.015%. The dried polyol mixture was then maintained at 60° C. In another reactor equipped with mechanical stirrer and nitrogen blanket, 220.4 parts of 4,4'-MDI, commercially available from Dow Chemical Company under the trade name Isonate 125M, were added and heated to 50° C. until the MDI was molten. The polyol mixture at 60° C. was then added into the reactor stepwise with stirring in order to minimize the reaction exotherm. The contents of the reactor were allowed to react at 70° C. for 6 hours, after which NCO titration was carried out to verify completion of the reaction.

Polyurethane/Urea Elastomer Preparation

All of the above polyisocyanate prepolymers, except the t,t-HMDI-based prepolymer, were degassed and held at 80–90° C. The t,t-HMDI-based prepolymer was degassed and held at 120–130° C. All of the prepolymers were then mixed and cured with either a symmetric aromatic primary diamine chain extender, a mixture of symmetric aromatic primary diamine chain extenders and aromatic secondary diamine chain extenders, or a mixture of symmetric aromatic primary diamine chain extenders and the polyols described in this section, at above their respective melting points, to obtain the corresponding polyurethane/urea elastomers, in 8 inch×8 inch×0.080 inch molds preheated to 85° C. All of the elastomer samples were demolded within 30–60 minutes and then post-cured at 100° C. for 24 hours.

Polyurethane/Urea Elastomer Testing

All of the above polyurethane/urea samples were tested for hardness (ASTM D-2240), moduli of aged and unaged samples (ASTM D-412), and cold flexibility (Gehman Test, ASTM D-1053 and Tinius Olson Brittle Point (TOBP), ASTM D-2137A). Aging of the samples for moduli testing involved heat aging the samples at 140–150° C. for two weeks.

The following describe the polyols included in the Examples of Tables 1–4:

* PHC2000 = poly(hexamethylene carbonate) diol with molecular weight of 2000, commercially available from Miles Inc., under the trade name Vulkollan 2020E, or from Nippon Polyurethane Industries, Inc., under the trade name Nippollan 980R.
* PCL2000 = polycaprolactone diol with molecular weight of 2000, commercially available from Union Carbide Corp. under the trade name Tone 0240.
* PHA2000 = poly(hexamethylene adipate) diol with molecular weight of 2000, commercially available from Inolex Chemical Co. under the trade name Lexorez 1130-55.
* PHC1000 = poly(hexamethylene carbonate) diol with molecular weight of 1000, commercially available from Nippon Polyurethane Industries, Inc., under the trade name Nippollan 981R.
* PCL1250 = polycaprolactone diol with molecular weight of 1250, commercially available from Union Carbide Corp. under the trade name Tone 0230.

The following describe the chain extenders included in the Examples of Tables 1–4:

* TGDAB = trimethylene glycol di-para-aminobenzoate
* MCDEA = 4,4'-methylene-bis-(3-chloro-2,6-diethylaniline)
* MOCA = 4,4'-methylene-bis-(ortho-chloroaniline)
* MDCA = 4,4'-methylene-bis-(2,3-dichloroaniline)
* MDEA = 4,4'-methylene-bis-(2,6-diethylaniline)
* DBADM = N,N'-di-sec-butyl-amino-diphenylmethane
* DMTDA = 3,5-dimethylthio toluene-(2,4 or 2,6)-diamine
* MMA = methylene-bis-methyl anthranilate

TABLE 1

| | EXAMPLE | | | | |
|---|---|---|---|---|---|
| | 1 | 2 | 3 | 4 | 5 |
| Polyol 1 | PHC2000 | PCL2000 | PHC2000 | PHC2000 | PHC2000 |
| Polyol 2 | | | PCL2000 | PCL2000 | PCL2000 |
| Wt (%) | | | 70:30 | 70:30 | 70:30 |
| Polyol 1:2 Diisocyanate | PPDI | PPDI | PPDI | PPDI | PPDI |
| NCO (%) | 3.47 | 3.53 | 3.46 | 3.46 | 3.46 |
| Viscosity (ctsks, 85° C.) | >16000 | 1850 | 5960 | 5960 | 5960 |
| Chain Extender | TGDAB | TGDAB | TGDAB | MCDEA | MOCA |
| [NCO]/[NH$_2$] | 1.10 | 1.10 | 1.10 | 1.10 | 1.10 |
| Hardness (Shore A) | 92 | 91 | 90 | 91 | 86 |
| (%) Modulus Retained upon Heat Aging (2 wks) | | | | | |
| Temp, ° C. | 150 | 150 | 145 | 145 | 145 |
| M50 (%) | 91 | 94 | 97 | 97 | 97 |
| M100 (%) | 87 | 93 | 94 | 96 | 94 |
| Gehman Cold Flexibility | | | | | |
| T$_2$ (° C.) | −22 | −8 | −33 | −28 | −30 |
| T$_5$ (° C.) | −30 | −48 | −40 | −40 | −35 |
| T$_{10}$ (° C.) | −34 | −56 | −46 | −43 | −41 |
| TOBP (° C.) | −70 | −54 | −70 | −70 | −66 |

TABLE 2

| | EXAMPLE | | | | | |
|---|---|---|---|---|---|---|
| | 6 | 7 | 8 | 9 | 10 | 11 |
| Polyol 1 | PHC2000 | PHC2000 | PHC2000 | PHC2000 | PHC2000 | PHC2000 |
| Polyol 2 | PCL2000 | PHA2000 | PCL2000 | PCL2000 | PCL2000 | PCL2000 |
| Wt (%) | 70:30 | 40:60 | 20:80 | 40:60 | 40:60 | 20:80 |
| Polyol 1:2 Diisocyanate | PPDI | PPDI | PPDI | t,t-HMDI | PPDI | PPDI |
| NCO (%) | 3.46 | 3.59 | 3.53 | 3.80 | 3.46 | 3.62 |
| Viscosity (ctsks, 85° C.) | 5960 | 3150 | 1960 | 13200 | 2890 | 1960 |
| Chain Ext. (A) | MDCA | TGDAB | TGDAB | MDEA | TGDAB | TGDAB |
| Polyol (B) | | | | | PHC2000 | PHC2000 |
| Polyol (C) | | | | | PCL2000 | |
| Wt (%) A:B:C | | | | | 40:24:36 | 40:60 |
| [NCO/[NH$_2$ + OH] | 1.10 | 1.10 | 1.10 | 1.05 | 1.10 | 1.05 |
| Hardness (Shore A) | 85 | 92 | 91 | 91 | 86 | 86 |
| (%) Modulus Retained upon Heat Aging (2 wks) | | | | | | |
| Temp, ° C. | 145 | 150 | 150 | 140 | 150 | 150 |
| M50 (%) | 97 | 91 | 94 | 95 | 93 | 86 |
| M100 (%) | 97 | 87 | 92 | 94 | 91 | 84 |

TABLE 2-continued

| | EXAMPLE | | | | | |
|---|---|---|---|---|---|---|
| | 6 | 7 | 8 | 9 | 10 | 11 |
| Gehman Cold Flexibility | | | | | | |
| $T_2$ (° C.) | −22 | −22 | −41 | −34 | −43 | −45 |
| $T_5$ (° C.) | −31 | −40 | −52 | −52 | −54 | −56 |
| $T_{10}$ (° C.) | −35 | −48 | −58 | −58 | −58 | −60 |
| TOBP (° C.) | −70 | −70 | −54 | −70 | −70 | −70 |

TABLE 3

| | EXAMPLE | | | | |
|---|---|---|---|---|---|
| | 12 | 13 | 14 | 15 | 16 |
| Polyol 1 | PHC2000 | PHC2000 | PHC2000 | PHC2000 | PHC2000 |
| Polyol 2 | PCL2000 | PCL2000 | PCL2000 | PCL2000 | PCL2000 |
| Wt (%) | 40:60 | 40:60 | 40:60 | 40:60 | 40:60 |
| Polyol 1:2 | | | | | |
| Diisocyanate | PPDI | PPDI | PPDI | PPDI | PPDI |
| NCO (%) | 3.46 | 3.46 | 3.46 | 3.46 | 3.46 |
| Viscosity (ctsks, 85° C.) | 2890 | 2890 | 2890 | 2890 | 2890 |
| Chain Ext. 1 | TGDAB | TGDAB | TGDAB | TGDAB | |
| Chain Ext. 2 | | DBADM | DBADM | DBADM | DBADM |
| Wt (%) C. E. 1:2 | | 90:10 | 75:25 | 50:50 | |
| [NCO]/[NH$_2$] | 1.10 | 1.10 | 1.10 | 1.10 | 1.10 |
| Hardness (Shore A) | 91 | 90 | 86 | 75 | 62 |
| (%) Modulus Retained upon Heat Aging (2 wks) | | | | | |
| Aging Temp, ° C. | 150 | 150 | 150 | 150 | 150 |
| M50 (%) | 92 | 92 | 84 | (116)* | molten |
| M100 (%) | 90 | 92 | 86 | (142)* | molten |
| Gehman Cold Flexibility | | | | | |
| $T_2$ (° C.) | −35 | −31 | −31 | −19 | −26 |
| $T_5$ (° C.) | −42 | −39 | −39 | −28 | −30 |
| $T_{10}$ (° C.) | −46 | −43 | −43 | −35 | −33 |
| TOBP (° C.) | −70 | −66 | −70 | −70 | −70 |

*Elastomer samples of Example 15 became brittle and cheesy upon heat aging.

TABLE 4

| | EXAMPLE | | | |
|---|---|---|---|---|
| | 17 | 18 | 19 | 20 |
| Polyol 1 | PHC2000 | PHC2000 | PHC1000 | PCH1000 |
| Polyol 2 | PCL2000 | PCL2000 | PCL1250 | PCL1250 |
| Wt (%) Polyol 1:2 | 70:30 | 70:30 | 40:60 | 40:60 |
| Diisocyanate | PPDI | PPDI | 80:20 TDI | MDI |
| NCO (%) | 3.46 | 3.46 | 5.80 | 4.83 |
| Viscosity (ctsks, 85° C.) | 5960 | 5960 | 1020 | 3750 |

TABLE 4-continued

| | EXAMPLE | | | |
|---|---|---|---|---|
| | 17 | 18 | 19 | 20 |
| Chain Ext. | DMTDA | MMA | TGDAB | TGDAB |
| [NCO]/[NH$_2$] | 1.10 | 1.10 | 1.10 | 1.10 |
| Hardness (Shore A) | 81 | 84 | 96 | 96 |
| (%) Modulus Retained upon Heat Aging (2 wks) | | | | |
| Temp, ° C. | 145 | 145 | 150 | 150 |
| M50 (%) | 64 | 72 | 77 | 77 |
| M100 (%) | 68 | 76 | 69 | 72 |
| Gehman Cold Flexibility | | | | |
| $T_2$ (° C.) | −22 | −15 | −5 | −11 |
| $T_5$ (° C.) | −34 | −23 | −19 | −24 |
| $T_{10}$ (° C.) | −38 | −28 | −27 | −32 |
| TOBP (° C.) | −70 | −68 | −70 | −70 |

Examples 1–9 of Tables 1–2 illustrate that the polyurethane/urea elastomers of the present invention prepared from poly(hexamethylene carbonate) diol, polycaprolactone diol, poly(hexamethylene adipate) diol or mixtures thereof, PPDI or t,t-HMDI, and symmetric aromatic primary diamines such as TGDAB, MCDEA, MOCA, MDCA and MDEA, display high temperature thermal stability at 140–150° C. and low temperature flexibility at −35–(−40)° C. Poly(hexamethylene carbonate) diol imparts low temperature toughness. Polycaprolactone diol or poly(hexamethylene adipate) diol, when mixed with poly(hexamethylene carbonate) diol, imparts low temperature flexibility and also reduces prepolymer viscosity. The use of the compact and symmetric PPDI or the trans,trans geometrically configured t,t-HMDI with any symmetric aromatic primary diamine chain extender aggressively promotes phase separation of the resulting polyurethane/urea elastomers which in turn enhances high temperature stability as well as low temperature flexibility. These highly phase-separated elastomers also exhibit a high level of chemical resistance, flex crack resistance, and low hysteresis suitable for dynamic applications such as belts.

Examples 12–16 of Table 3 indicate that up to about 25% by weight of a bulky aromatic secondary diamine such as DBDAM may be used as a co-curative with a symmetric aromatic primary diamine chain extender such as TGDAB in order to tailor certain elastomer properties such as hardness without significantly affecting other desirable properties.

Examples 10 and 11 of Table 2 indicate that about 60% by weight of the long chain polyols used to form the polyisocyanate prepolymer of the present invention may also be used with the symmetric aromatic primary diamine chain extenders to adjust physical characteristics such as hardness without significantly affecting other desirable properties. These polyols do not act as chain extenders formulations; their long chains extend the soft segments of the polyurethane/urea elastomers of the present invention.

Examples 17–20 of Table 4 verify that nonsymmetric DMTDA, bulky MMA, and 80:20-TDI and MDI are not suitable for the present invention due to the inferior high temperature thermal stabilities and inadequate low temperature flexibilities of the resulting polyurethane/urea elastomers.

The polyurethane/urea elastomer of the present invention is a combination of hard and soft segments formed by the reaction of the above constituents. The constituents promote phase separation, eliminate the need for catalysts and antioxidants thus increasing thermal stability, and improve the dynamic performance of the final elastomer composition at high and low temperatures.

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A power transmission belt subject to dynamic loading in use formed from a solid polyurethane/urea elastomer composition having high temperature resistance to about 140° C. and low temperature resistance to about −35° C. in dynamic applications, comprising the reaction product of:
   (a) a polyisocyanate prepolymer composition being prepared by reacting,
      (i) a diisocyanate selected from the group consisting of,
         (A) para-phenylene diisocyanate,
         (B) 2,6-toluene diisocyanate, and
         (C) a cycloaliphatic diisocyanates with trans or trans, trans geometric structure, with;
      (ii) a polyol substantially free of moieties oxidative at less than about 150° C. and selected from the group consisting of;
         (A) polycarbonate polyols,
         (B) polyester polyols, and
         (C) mixtures of said polycarbonate polyols and said polyester polyols, and;
   (b) a chain extender which contributes increased thermal stability to the polyurethane/urea elastomer, selected from the group consisting of;
      (i) aromatic symmetric primary diamine chain extenders,
      (ii) mixtures of said aromatic symmetric primary diamine chain extenders and aromatic secondary diamine chain extenders, and;
      (iii) mixtures of said aromatic symmetric primary diamine chain extenders and said polyols;
said polyurethane/urea elastomer composition having an isocyanate to amine or amine/hydroxyl equivalent ratio of from about 0.95:1 to about 1.20:1, and said polyisocyanate prepolymer composition having an isocyanate group content of from about 2% to about 12% by weight.

2. The power transmission belt of claim 1 wherein said polyisocyanate prepolymer composition is based on para-phenylene diisocyanate, and has an NCO/OH ratio of about 2:1.

3. The power transmission belt of claim 1 wherein said polyol is said polycarbonate polyol and has molecular weight of from about 500 to about 3000.

4. The power transmission belt of claim 3 wherein said polycarbonate polyol is poly(hexamethylene carbonate) diol and has molecular weight of from about 500 to about 3000.

5. The power transmission belt of claim 4 wherein said poly(hexamethylene carbonate) diol has molecular weight of from about 1500 to about 2500.

6. The power transmission belt of claim 1 wherein said chain extender is said mixture of said symmetric primary diamine chain extenders and said polyols, and said mixture of said symmetric primary diamine chain extenders and said polyols comprise up to about 40% to 50% by weight of said polyols.

7. A power transmission belt subject to dynamic loading in use formed from a solid polyurethane/urea elastomer composition having high temperature resistance to about 140° C. and low temperature resistance to about −35° C. in dynamic applications, comprising the reaction product of:
   (a) a polyisocyanate prepolymer composition being prepared by reacting,
      (i) a diisocyanate selected from the group consisting of;
         (A) tans-1,4-cyclohexane diisocyanate, and
         (B) trans,trans-4,4'-dicyclohexylmethyl diisocyanate, with;
      (ii) a polyol substantially free of moieties oxidative at less than about 150° C. and selected from the group consisting of;
         (A) polycarbonate polyols,
         (B) polyester polyols, and
         (C) mixtures of said polycarbonate polyols and said polyester polyols, and;
   (b) a chain extender, selected from the group consisting of;
      (i) aromatic symmetric primary diamine chain extenders,
      (ii) mixtures of said aromatic primary diamine chain extenders and aromatic secondary diamine chain extenders, and,
      (iii) mixtures of said aromatic primary diamine chain extenders and said polyols;
said polyurethane/urea elastomer composition having an isocyanate to amine or amine/hydroxyl equivalent ratio of from about 0.95:1 to about 1.20:1, and said polyisocyanate prepolymer composition having an isocyanate group content of from about 2% to about 12% by weight.

8. The power transmission belt of claim 7 wherein said polyisocyanate prepolymer composition is based on trans, trans-4,4'-dicyclohexylmethyl diisocyanate, and has an NCO/OH ratio of about 2.2:1.

9. A power transmission belt subject to dynamic loading in use formed from a solid polyurethane/urea elastomer composition having high temperature resistance to about 140° C. and low temperature resistance to about −35° C. in dynamic applications, comprising the reaction product of:
   (a) a polyisocyanate prepolymer composition being prepared by reacting,
      (i) a diisocyanate selected from the group consisting of;
         (A) aromatic diisocyanates with symmetric structure, and
         (B) cycloaliphatic diisocyanates with trans or trans, trans geometric structure, with;

(ii) a polyol substantially free of moieties oxidative at less than about 150° C. and selected from the group consisting of;
  (A) polycarbonate polyols,
  (B) polyester polyols, and
  (C) mixtures of said polycarbonate polyols and said polyester polyols, and;
(b) a mixture of aromatic symmetric primary diamine chain extenders and aromatic secondary diamine chain extenders and said secondary diamine chain extenders have molecular weight of from about 150 to about 500, said polyurethane/urea elastomer composition having an isocyanate to amine or amine/hydroxyl equivalent ratio of from about 0.95:1 to about 1.20:1, and said polyisocyanate prepolymer composition having an isocyanate group content of from about 2% to about 12% by weight.

10. The power transmission belt of claim 9 wherein said secondary diamine chain extender is selected from the group consisting of;
  (a) N,N'-di-sec-butyl-amino-benzene, and
  (b) N,N'-di-sec-butyl-amino-diphenylmethane.

11. The power transmission belt of claim 10 wherein said mixture of said symmetric primary di amine chain extenders and said secondary diamine chain extenders comprises up to about 25% by weight of said secondary diamine chain extenders.

12. A power transmission belt having a belt body comprising the reaction product of,
  (a) a polyisocyanate prepolymer composition having an isocyanate group content of from about 2% to about 12% by weight, and being prepared by reacting,
    (i) para-phenylene diisocyanate, and,
    (ii) a mixture of poly(hexamethylene carbonate) diol and polycaprolactone diol, wherein said mixture contains about 40% by weight of said poly(hexamethylene carbonate) diol, and about 60% by weight of said polycaprolactone diol, and,
  (b) trimethylene glycol di-para-aminobenzoate.

13. The power transmission belt of claim 12 wherein the isocyanate group content of said polyisocyanate prepolymer composition is from about 3.4% to about 4.0% by weight.

14. The power transmission belt of claim 12 wherein said mixture of poly(hexamethylene carbonate) diol and polycaprolactone diol contains less than about 0.03% by weight water.

15. A process for the manufacture of power transmission belting from polyurethane/urea elastomer comprising the steps of:
  (a) feeding into a reactor a polyol substantially free of moieties oxidative at less than about 150° C. and selected from the group consisting of polycarbonate polyols, polyester polyols and mixtures thereof;
  (b) drying said polyol;
  (c) adding to said polyol a diisocyanate selected from the group consisting of aromatic diisocyanates with symmetric structure and cycloaliphatic diisocyanates with trans or trans, trans geometric structure;
  (d) reacting said diisocyanate and said polyol at from about 60° C. to about 80° C. for from about 3 hours to about 10 hours to form a polyisocyanate prepolymer having an isocyanate group content of from about 2% to about 12% by weight;
  (e) forming a mixture of said polyisocyanate prepolymer and a chain extender which contributes increased thermal stability to the polyurethane/urea elastomer selected from the group consisting of aromatic symmetric primary diamines, mixtures of said aromatic primary diamines and aromatic secondary diamine chain extenders, and mixtures of said aromatic primary diamine chain extenders and said polyols;
  (f) filling said mixture into a belt forming mold;
  (g) polymerizing said mixture;
  (h) demolding said solid polyurethane/urea elastomer belting; and
  (i) post-curing said solid polyurethane/urea elastomer until the polymerization is complete.

16. The process of claim 15 wherein said diisocyanate and said polyols are reacted at from about 60° C. to about 70° C.

17. The process of claim 15 wherein said diiscocyanate and said polyols are reacted for from about 5 hours to about 6 hours.

18. The process of claim 15 wherein the polyurethane/urea elastomer is prepared substantially free of the presence of any catalyst.

19. A power transmission belt subject to dynamic loading in use formed from a solid polyurethane/urea elastomer composition having high temperature resistance to about 140° C. and low temperature resistance to about −35° C. in dynamic applications, comprising the reaction product of:
  (a) a polyisocyanate prepolymer composition being prepared by reacting;
    (i) a diisocyanate selected from the group consisting of;
      (A) monocyclic aromatic diisocyanates with compact and symmetric structure, and;
      (B) cycloaliphatic diisocyanates with tans or trans, trans geometric structure; with,
    (ii) a polyol substantially free of moieties oxidative at less than about 150° C. and selected from the group consisting of;
      (A) polycarbonate polyols,
      (B) polyester polyols, and
      (C) mixtures of said polycarbonate polyols and said polyester polyols; and,
  (b) a chain extender which contributes increased thermal stability to the polyurethane/urea elastomer, selected from the group consisting of;
    (i) aromatic symmetric primary diamine chain extenders,
    (ii) mixtures of said aromatic symmetric primary diamine chain extenders and aromatic secondary diamine chain extenders, and
    (iii) mixtures of said aromatic symmetric primary diamine chain extenders and said polyols;
said polyurethane/urea elastomer having an isocyanate to amine or amine/hydroxyl equivalent ratio of from about 0.95:1 to about 1.20:1, and said polyisocyanate prepolymer composition having an isocyanate group content of from about 2% to about 12% by weight.

20. The power transmission belt of claim 19 wherein said isocyanate group content of said polyisocyanate prepolymer composition is from about 3% to about 7% by weight.

21. The power transmission belt of claim 19 wherein said isocyanate group content of said polyisocyanate prepolymer composition is from about 3.4% to about 4.0% by weight.

22. The power transmission belt of claim 19 wherein said polyisocyanate prepolymer composition has an NCO/OH ratio of from about 1.8:1 to about 2.4:1.

23. The power transmission belt of claim 19 wherein said polyol contains less than about 0.03% by weight water.

24. The power transmission belt of claim 19 wherein said polyol is said polyester polyol and has a molecular weight of from about 500 to about 3000.

25. The power transmission belt of claim 24 wherein said polyester polyol is polycaprolactone diol and has molecular weights of from about 500 to about 3000.

26. The power transmission belt of claim 25 wherein said polycaprolactone diol has molecular weights of from about 1500 to about 2500.

27. The power transmission belt of claim 24 wherein said polyester polyol is poly(hexamethylene adipate) diol and has molecular weight of from about 500 to about 3000.

28. The power transmission belt of claim 27 wherein said poly(hexamethylene adipate) diol has molecular weight of from about 1500 to about 2500.

29. The power transmission belt of claim 18 wherein said chain extender is said symmetric primary diamine chain extender and has molecular weight of from about 90 to about 500.

30. The power transmission belt of claim 29 wherein said symmetric primary diamine chain extender is selected from the group consisting of;

(a) 4,4'-methylene-bis-(3-chloro-2,6-diethylaniline),
(b) 4,4'-methylene-bis-(ortho-chloroaniline),
(c) 4,4'-methylene-bis-(2,3-dichloroaniline),
(d) trimethylene glycol di-para-aminobenzoate,
(e) 4,4'-methylene-bis(2,6-diethylaniline),
(f) 4,4'-methylene-bis(2,6-diisopropylaniline),
(g) 4,4'-methylene-bis(2-methyl-6-isopropylaniline), and
(h) mixtures of two or more of the foregoing symmetric primary diamine chain extenders.

31. The power transmission belt of claim 19 comprising a main belt body portion formed of said polyurethane/urea composition, textile cord tensile members disposed in said body portion and a sheave contact portion integral with said main body portion.

32. The power transmission belt of claim 19 wherein the polyurethane/urea elastomer is prepared substantially free of the presence of any catalyst.

33. The power transmission belt of claim 19, wherein said belt is in the form of an automotive power transmission belt.

* * * * *